United States Patent [19]
Marchello

[11] 3,922,929
[45] Dec. 2, 1975

[54] BICYCLE PEDAL CRANK EXTENDER

[76] Inventor: John L. Marchello, 57751 Grand River Ave., New Hudson, Mich. 48165

[22] Filed: Dec. 12, 1973

[21] Appl. No.: 426,685

[52] U.S. Cl. ................................ 74/562; 74/594.1
[51] Int. Cl.² ......................................... G05G 1/14
[58] Field of Search ....... 74/522, 525, 594.1, 594.3, 74/594.4, 544, 546, 562

[56] References Cited
UNITED STATES PATENTS
2,533,011   12/1950   Hill .................................. 74/594.1
FOREIGN PATENTS OR APPLICATIONS
876,494   11/1942   France .............................. 74/594.1

Primary Examiner—Samuel Scott
Assistant Examiner—Frank H. McKenzie, Jr.
Attorney, Agent, or Firm—Cullen, Settle, Sloman & Cantor

[57] ABSTRACT

An extender for removable attachment to the lower end of and for extending the length of a conventional bicycle pedal crank and adjustably lowering the bicycle pedal relative to the bicycle seat. The extender is formed of an elongated channel shaped to receive the lower end portion of a conventional pedal crank with the upper end of the extender shaped to spring grip the crank. The lower end of the extender is formed with a threaded socket to receive and threadedly engage the threaded mounting stud of a conventional bicycle pedal. The base of the extender channel is formed with a longitudinally elongated slot for overlapping the conventional pedal stud receiving opening formed in the lower end of the crank. A bolt fits through the slot and the crank pedal stud receiving opening to lock the extender in longitudinally adjustable positions upon the crank.

5 Claims, 9 Drawing Figures

U.S. Patent   Dec. 2, 1975   3,922,929
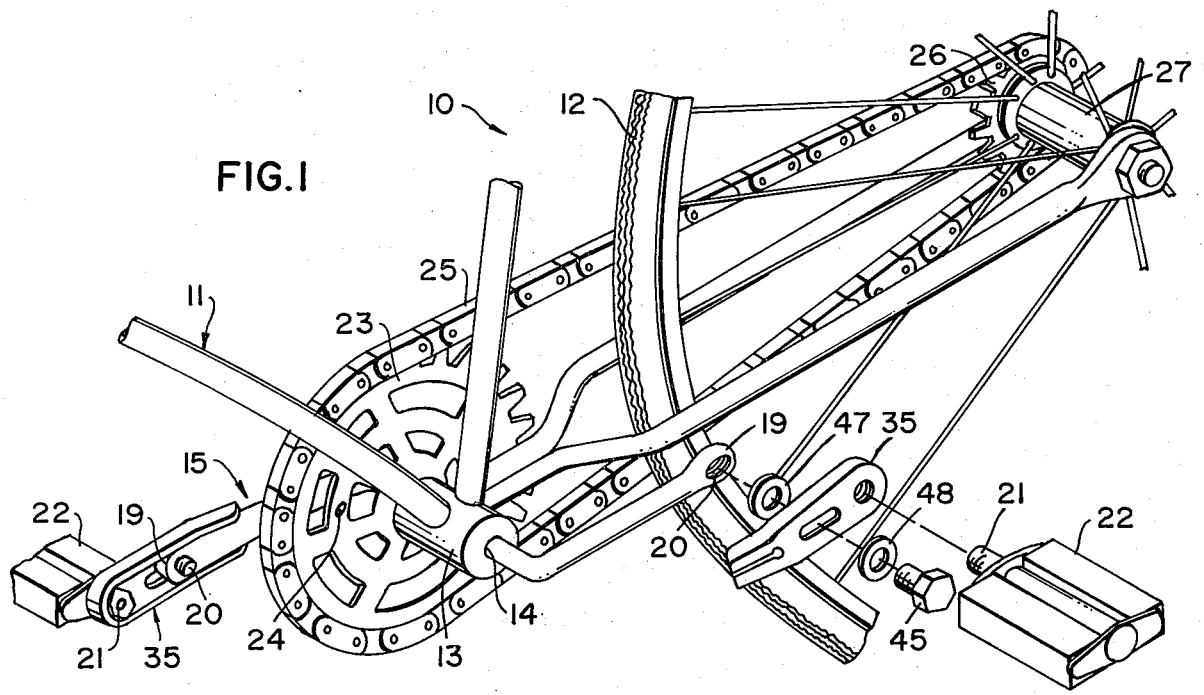
FIG. 1
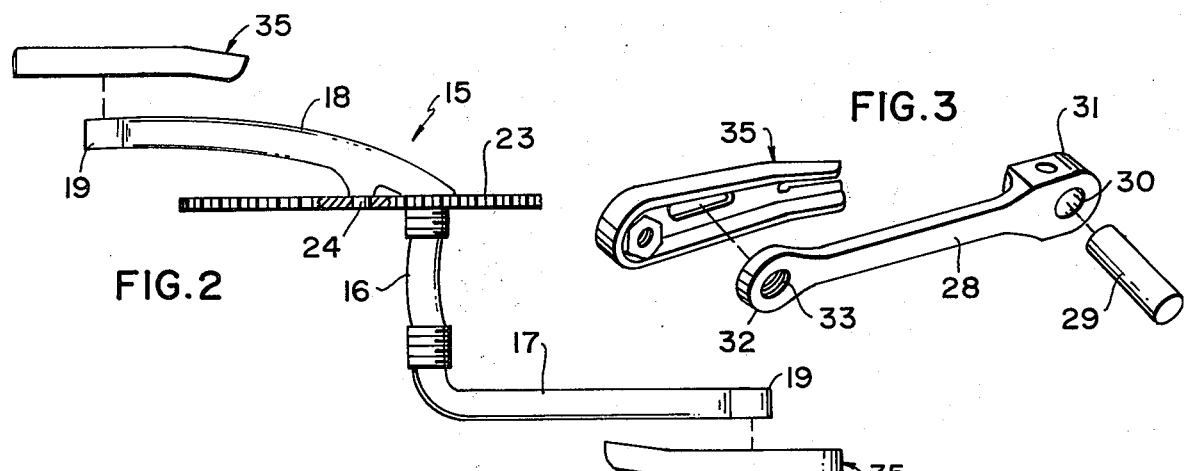
FIG. 2      FIG. 3
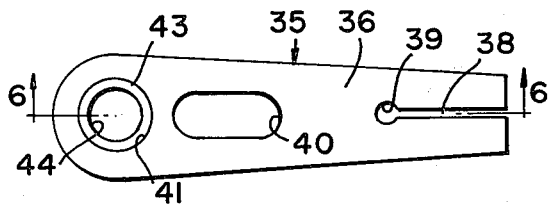
FIG. 4
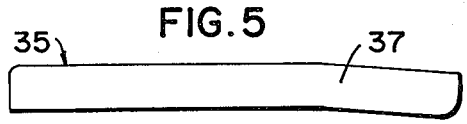
FIG. 5
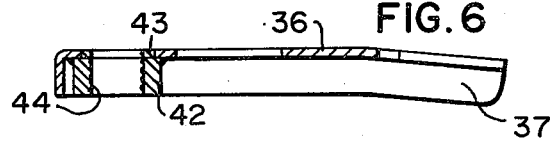
FIG. 6
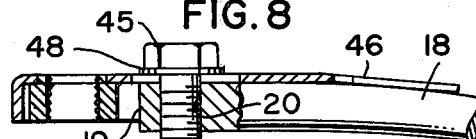
FIG. 7
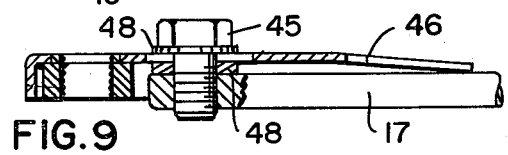
FIG. 8
FIG. 9

3,922,929

BICYCLE PEDAL CRANK EXTENDER

BACKGROUND OF INVENTION

The invention herein relates to an extender useful for lengthening a standard bicycle crank. Conventional bicycles utilize a crank assembly consisting of a pair of oppositely extending crank elements, interconnected by a cross member journalled through a hub formed on the bicycle frame, to power the bicycle. A foot pedal is connected to the free end of each crank. Such crank assemblies have been standardized into two general types. One type, primarily utilized on bicycles manufactured in the United States, consists of a one-piece forging wherein both cranks and the connector element are made in one part. The second type, primarily used in European manufactured bicycles, consists of two separate cranks which are mechanically joined to a separate connector member. The cranks themselves, in both types of assemblies, are of standardized length, roughly in the area of about 6½ inches.

In cross section, standard cranks, whether of the one-piece assembly or the three-piece assembly, are made either circular, oval or roughly rectangular.

The conventional bicycle pedals are provided with a threaded stud which interconnect with the correspondingly threaded opening on the crank end. Commonly, a left and a right hand thread are used on the respective cranks, with cranks manufactured in the United States made in accordance with a standard inch measured thread and those manufactured in Europe, manufactured in accordance with a slightly different metric measured thread.

Thus, practically all bicycles available have cranks which are of approximately the same length and approximately of the same thickness or width, although of slightly different cross-sectional configuration, and which include one of four standard threaded openings to receive pedal studs, i.e., a left or right hand thread and a metric or inch measured thread.

Since the length of the standardized crank was based upon average size riders of bicycles, for longer legged riders, or for riders who wish to obtain greater power from a larger moment arm, it is desirable to have available longer cranks and preferably cranks whose length may be adjusted to lengthen the crank from its standard length to a point of maximum length, that is, interference with the ground.

Thus, the invention herein is concerned with providing a standardized, simple crank extender which may be utilized on any one of the standard cranks, either of the United States type or the European type and which may be easily fabricated, with only a slight change, to accommodate to one of the four types of threaded pedal starts.

SUMMARY OF THE INVENTION

The invention herein contemplates providing a channel shaped crank extender which is shaped to receive the end portion of any conventional bicycle crank and to frictionally grip and lock to the crank end as well as to be fastened thereto by means of a bolt engaged with the threaded pedal stud opening in the crank. The extender includes an insert for threadedly engaging with the pedal stud, with the insert being permanently fastened to the extender channel. Four different type inserts are provided, i.e., lefthand, righthand, inch and metric threaded openings. Thus, the extender is at all times made from one identical channel to which is assembled one of the four different inserts.

The channel is preferably formed of a springy material, such as thick springy sheet steel, stamped into the appropriate channel shape. Its upper end is preferably slit to increase the springiness thereof so that the legs of the channel will spring grip and frictionally grasp the crank portion inserted therebetween. In addition, the channel base is preferably bent into two planes, namely, a flat base plane and an inwardly bent upper end plane portion so that the channel may accommodate either straight cranks or commonly used curved cranks.

Essentially, the invention herein contemplates a single stamped metal channel formed to receive the end portions of all types of standardized bicycle pedal cranks and formed to frictionally and resiliently grip the crank as well as be secured thereto with a bolt, with the pedal then engaged with the insert attached to the channel to thus increase the effective length of the crank.

These and other objects and advantages of this invention will become apparent upon reading the following description, of which the attached drawings form a part.

DESCRIPTION OF DRAWINGS

FIG. 1 is a fragmentary perspective view of a portion of a conventional bicycle and particularly illustrating a conventional crank assembly on the bicycle.

FIG. 2 is a plan view of a conventional one-piece forged type of crank assembly.

FIG. 3 is a perspective view of a crank and a connector, shown disassembled, of a conventional three-piece crank assembly, with the extender illustrated in position for mounting upon the crank.

FIG. 4 is a plan view of the extender, per se.

FIG. 5 is an elevational view of the extender.

FIG. 6 is a cross-sectional view taken in the direction of arrows 6—6 of FIG. 4.

FIG. 7 is a bottom view of the extender with a crank fitted therein, the crank being shown in dotted lines.

FIG. 8 is a cross-sectional view of the extender mounted upon a curved crank, and FIG. 9 is a cross-sectional view of the extender mounted upon a straight crank.

DETAILED DESCRIPTION

FIG. 1 schematically illustrates a portion of a conventional bicycle which includes a frame 11, a rear wheel 12 and a crank hub 13 having an opening 14 through which a crank assembly 15 is journalled.

The crank assembly is shown in the form of the one-piece or integral forged, United States manufactured style. It consists of a central connector portion 16 (see FIG. 2), with an integral straight crank 17 and an oppositely extended curved crank 18, each of which is provided with enlarged lower ends or heads 19 having threaded openings 20, appropriately threaded in either a right or left hand direction to receive the conventional threaded stud 21 of a conventional bicycle pedal 22. The central connector 16 may be provided with threaded portions and shoulder portions including a shoulder upon which a conventional sprocket 23 is mounted and engaged by a crank sprocket boss 24 for rotating the sprocket and driving the bicycle sprocket chain 25 which in turn engages the rear sprocket 26 mounted on the rear wheel hub 27.

The foregoing describes a conventional one-piece assembly. FIG. 3 shows part of a conventional three-piece crank assembly, of the type commonly used on European manufactured bicycles. Such assembly usually comprises a pair of straight cranks 28 (only one shown in FIG. 3), and a separate connector shaft 29 which is journalled through the bicycle hub 13. Each crank includes an opening 30 formed in an enlarged upper end 31 for receiving and fastening to the connector 29. The lower end of each crank is provided with an enlargement 32 with a threaded pedal stud receiving opening 33, usually of a metric type of thread and either left hand or right hand in direction.

The extender, generally designated as 35, is formed to fit on the end portions of any of the foregoing types of cranks. Thus, the extender is formed of a channel shaped metal stamping, preferably of springy material, with a roughly flat base 36 and integral legs 37 which may extend along the sides of the base and continue around the lower end of the base to completely enclose the base except for its upper end. An elongated slit 38 is formed in the upper end of the base and terminates in a widened opening 39 to provide greater springiness of the upper end of the extender portion and particularly to permit resilient movement of the leg portions located on opposite sides of the slits.

A longitudinally elongated slot 40 is formed roughly in the center of the base and a hole 41 is formed at the lower end of the base. An insert 42, which may be in the form of a conventional nut having a collar 43 inserted in the hole 41 is fastened to the base, as by conventional welding. The insert is provided with a central threaded opening 44.

To mount the extender upon a crank, the crank lower end portion is forced into the channel, between the legs thereof, with the spacing between the legs, particularly at the upper end of the channel being close enough as to form an interference fit. Thus, the legs spring grip the adjacent portion of the crank. As can be seen in the drawings, the base is preferably formed in a tapered shape so that the legs gradually are spaced closer together along the length of the channel with the upper end of the channel thus being narrower than the lower end.

The elongated slot 40 overlaps the stud receiving opening 20 formed in the crank and a bolt 45 extends through the channel base and threadedly interlocks with said threaded opening 20 to mechanically lock the channel to the crank. The extender may be adjusted longitudinally relative to the crank, within the limits of the length of the slot 40, which preferably is roughly one and one-half inches in length, to give an approximate adjustment of about one and one-half inches.

The channel base 35 is bent so that its upper one-third portion forms an inwardly directed base part 46, that is, inwardly directed relative to the channel. The degree of bending may be on the order of roughly five degrees, more or less, so as to form a rather open obtuse angle relative to the remainder of the base. Thus, the base can accommodate either the curved crank 18 or the straight cranks 17 and 28.

In fastening the bolt 45 through the channel base and into the threaded opening in the crank, a washer 47 is positioned on the outside of the extender. A washer 48 may be positioned inside the extender (see FIG. 9) in the case where the crank is straight for thereby aligning the extender longitudinally with the crank and maintaining the pedal at a perpendicular angle to the crank.

In manufacturing the extender, one size and shape channel will fit virtually all standard cranks. However, at least four different inserts must be used, each threaded either right hand or left hand and either metric or inch in type. Thus, four basic inserts are required to fit standard pedal studs so that upon fabrication, four different extenders are produced.

With the foregoing construction, a standard bicycle crank which is roughly six and one-half inches in length from the center of the connector axis to the center of the pedal stud, may be lengthened as much as one and one-half inch approximately in suitable increments. Thus, the pedal may be better located for longer legged riders as well as making it possible for the rider to exert less force upon the pedal due to the increase in moment arm of the crank length.

Having fully described an operative embodiment of this invention, I now claim:

1. An extender for removable attachment to the lower end of and for adjustably extending the length of a conventional bicycle pedal crank having a shaft portion terminating in an end portion having an opening for receiving and mounting a conventional bicycle pedal mounting stud, comprising:

an elongated, stamped metal channel formed to include a base and integral legs and having an upper end and a lower end, said upper end receiving the crank shaft, and the channel being of a size to receive said crank shaft portion and end portion, with the portions of the legs at the extender upper end converging toward each other and being spaced apart a sufficient distance to resiliently frictionally grip the shaft portion between them, and said base being longitudinally slit at its upper end in the region where the legs converge and grip the shaft to permit resilient movement of the converging leg portions for receiving and gripping the shaft;

a longitudinally elongated slot formed in said base for overlapping the crank end portion opening, and for receiving a bolt engaged with said end portion opening for thereby fastening the crank to the extender, wherein the extender may be adjusted lengthwise of the crank within the limits of the length of said slot;

and a threaded socket rigidly connected to the lower end of the extender for receiving and securing said pedal mounting stud for thereby mounting a bicycle pedal upon the extender rather than upon the crank directly, said socket having a thickness several times greater than the thickness of the stamped metal channel base.

2. An extender as defined in claim 1 and the upper roughly one-third of said channel base being bent inwardly, that is, in a direction towards the free long edges of the channel legs, at a wide obtuse angle relative to the remaining portion of the channel base, for thereby receiving curved conventional pedal cranks within the channel.

3. An extender as defined in claim 1, wherein said legs extend along the sides of the base and continue around the lower end to completely enclose the base except for its upper end, said threaded socket having an axis for receiving said pedal mounting stud, and said legs extending parallel to the socket axis for receiving and gripping the pedal crank shaft.

4. An extender as defined in claim 1, and said channel being formed of a single piece of sheet-like metal; and said socket rigidly connected to the lower end of the extender comprising an insert member having a threaded opening for threadedly engaging a threaded pedal mounting stud, with the insert member being permanently fastened within the channel at the lower end of the channel, whereby inserts having threaded openings of different thread size and direction may be fastened within identical channels for mounting different standard pedal studs.

5. An extender as defined in claim 4, and said insert being partially arranged within and surrounded by the wall defining a hole formed in the base of the channel at the lower end of the channel.

* * * * *